US012194496B2

(12) United States Patent
Fritsch et al.

(10) Patent No.: US 12,194,496 B2
(45) Date of Patent: Jan. 14, 2025

(54) RESONANCE METHOD FOR A VIBRATION SYSTEM, A CONVERTER, AN EXCITATION UNIT AND THE VIBRATION SYSTEM

(71) Applicant: Siemens Aktiengesellschaft, Munich (DE)

(72) Inventors: Christoph Fritsch, Pommersfelden (DE); Theo Richter, Forchheim (DE); Martin Streubühr, Zirndorf (DE); Bernd Wedel, Möhrendorf (DE)

(73) Assignee: Siemens Aktiengesellschaft, Munich (DE)

( * ) Notice: Subject to any disclaimer, the term of this patent is extended or adjusted under 35 U.S.C. 154(b) by 19 days.

(21) Appl. No.: 18/023,642

(22) PCT Filed: Aug. 16, 2021

(86) PCT No.: PCT/EP2021/072685
§ 371 (c)(1),
(2) Date: Feb. 27, 2023

(87) PCT Pub. No.: WO2022/043108
PCT Pub. Date: Mar. 3, 2022

(65) Prior Publication Data
US 2023/0311159 A1 Oct. 5, 2023

(30) Foreign Application Priority Data
Aug. 31, 2020 (EP) .................................... 20193664

(51) Int. Cl.
*B06B 1/02* (2006.01)
*B06B 1/04* (2006.01)

(52) U.S. Cl.
CPC .......... *B06B 1/0246* (2013.01); *B06B 1/0261* (2013.01); *B06B 1/045* (2013.01); *B06B 2201/72* (2013.01)

(58) Field of Classification Search
CPC ... B06B 1/0246; B06B 1/045; B06B 2201/72; B06B 1/0261
(Continued)

(56) References Cited

U.S. PATENT DOCUMENTS 7,148,636 B2 12/2006 Ueda et al.
2015/0211857 A1* 7/2015 Ruf ........................ G01C 19/56 73/504.12
2019/0165247 A1 5/2019 Caldwell

FOREIGN PATENT DOCUMENTS

DE 4001367 A1 9/1991
DE 102011119949 A1 6/2013
EP 1216760 A2 6/2002

OTHER PUBLICATIONS

PCT International Search Report mailed DD MM YYYY corresponding to PCT International Application No. PCT/EP2021/072685 filed Aug. 16, 2021.

* cited by examiner

*Primary Examiner* — Arnold M Kinkead
(74) *Attorney, Agent, or Firm* — Henry M. Felereisen LLC

(57) ABSTRACT

A resonance method for a vibration system for resonant vibration of an excitation unit having a vibrating mass includes detecting a deflection of the vibrating mass, differentiating the deflection to form a velocity of the vibrating mass; generating from the deflection and the velocity a mechanical phase position; forming from the mechanical phase position a corrected phase position by using a correction value; forming, based on the corrected phase position, an electrical angular frequency with a P-regulation; integrating the electrical angular frequency to determine an electrical phase position; forming from the electrical phase position a correction factor by using a trigonometric function;
(Continued)

and applying the correction factor to an excitation setpoint value to generate a corrected excitation setpoint value. Also disclosed are a converter, an excitation unit having the converter, and a vibration system having the excitation unit and the vibrating mass.

17 Claims, 3 Drawing Sheets

(58) Field of Classification Search
USPC ....... 310/317, 316.01; 331/35; 318/116, 117, 318/118
See application file for complete search history.

RESONANCE METHOD FOR A VIBRATION SYSTEM, A CONVERTER, AN EXCITATION UNIT AND THE VIBRATION SYSTEM

CROSS-REFERENCES TO RELATED APPLICATIONS

This application is the U.S. National Stage of International Application No. PCT/EP2021/072685, filed Aug. 16, 2021, which designated the United States and has been published as International Publication No. WO 2022/043108 A1 and which claims the priority of European Patent Application, Ser. No. 20/193,664.8, filed Aug. 31, 2020, pursuant to 35 U.S.C. 119 (a)-(d).

BACKGROUND OF THE INVENTION

The invention relates to a resonance method for a vibration system for the resonant vibration of an excitation unit having a vibrating mass. Furthermore, the invention relates to a converter, the excitation unit and the vibration system.

Industrial applications with an electromechanical excitation unit for generating vibrations of a vibrating mass, in which a system capable of vibrating, hereinafter referred to as a vibration system, is to be excited with the vibrating mass in the region of a resonance frequency, in principle require a determination or estimation of this resonance frequency or the production of the state of the resonant vibration of the excitation unit and the vibrating mass which is to be caused to vibrate in order to be able to control or regulate the operating behavior of the vibration system in an energy-efficient, reliable and cost-effective manner.

In this case, the excitation unit usually comprises electromagnets which can be operated by means of electrical converters and cause the vibrating mass to vibrate on the basis of inductive energy transmission.

Even slight deviations in the resonant vibration of the excitation unit and the vibrating mass can lead to considerable losses in the energy efficiency/the level of efficiency or the quality of the desired operating behavior/the reliability of the respective application.

Thus, the determination of the resonance frequency or the steady-state, resonant vibration state of the excitation unit and the vibrating mass, which has hitherto been carried out separately from the actual operation, often requires considerable downtimes in the case of the corresponding machines and devices in production use, which in principle require additional outlay for the respective production process and thus also result in significant costs.

Such a vibration system is used, for example, as a friction welding machine or a vibratory conveyor.

The basic process of such a vibration system can be briefly outlined using the example of the friction welding machine. In order to weld a first workpiece to a second workpiece, the vibrating mass, which has a first workpiece carrier and the first workpiece connected thereto, is caused to vibrate by means of an excitation unit. As a rule, the vibrating mass is mounted such that it can vibrate by means of a spring apparatus.

In order to generate the frictional heat for this production process, the first workpiece is rubbed against the second workpiece, which is connected to a generally fixed second workpiece carrier, until it is welded.

If this excitation takes place with the resonance frequency, that is to say in vibration resonance between the excitation unit and the vibrating mass, the desired vibration can be generated with a particularly low expenditure of energy.

This resonance frequency of the vibration system is determined substantially by the vibrating mass, which here comprises the first workpiece, and the mounting capable of vibration of the vibrating mass, that is to say the spring rigidity of the spring apparatus used.

As the first workpiece contributes to the vibrating mass, after a workplace change of the first tool, if in particular the mass of the first workpiece changes, a new determination of the resonance frequency, that is to say of the resonant vibration state of the excitation unit and the vibrating mass, is absolutely necessary and at considerable expense.

Otherwise, the vibration system does not operate optimally, in particular energetically, as a result of which its level of efficiency is greatly reduced or the desired vibration amplitude may not be achieved and the required welding quality is rather poor.

Previous applications, such as friction welding, use predominantly preoperative methods for determination/estimation of the resonance frequency in order to subsequently excite the vibrating mass by means of the excitation unit and to achieve the required resonant vibration state of the excitation unit and the vibrating mass.

Thus, the desired resonance frequency is determined by means of an independent startup test prior to the actual production process and then operated therewith until a new startup test becomes necessary due to the use of a new first workpiece or undesirable deviations occurring in the meantime make a correction necessary during the production process.

This means that here the excitation of the vibration only takes place on the basis of the frequency determined by the startup test, which often only insufficiently hits the resonance frequency required in the actual production process for the resonant vibration state of the excitation unit and the vibrating mass, which can change due to wear and tear, differences in temperature, removal of material, etc., even during operation in the production process.

The object of the invention is therefore to propose a resonance method, a converter, an excitation unit and a vibration system which continuously determine a required resonant vibration state for resonant vibration of the excitation unit with a vibrating mass of the vibration system during production operation and operate the vibration system therewith.

SUMMARY OF THE INVENTION

The object is achieved by a resonance method as set forth hereinafter, by a converter as set forth hereinafter, by an excitation unit as set forth hereinafter, and by a vibration system as set forth hereinafter.

A resonance method for a vibration system for the resonant vibration of an excitation unit having a vibrating mass is proposed to achieve the object, comprising the steps of detecting a deflection for a deflection of the vibrating mass, forming a velocity for a velocity of the vibrating mass by means of differentiating the deflection, generating a phase position for a mechanical phase position by means of the deflection and the velocity, correcting a phase position for the mechanical phase position by means of a correction value to form a corrected phase position, forming a frequency for an electrical angular frequency by means of at least one P-regulation on the basis of the corrected phase position, forming a phase position for an electrical phase position by means of integration on the basis of the electrical angular frequency, forming a factor for a correction factor by means of a trigonometric function on the basis of the electrical phase position and setpoint value application of the correction factor to an excitation setpoint value in order to generate a corrected excitation setpoint value.

The method is advantageously based on the conceptual limitation of the freedom of movement (the degree of freedom) of the vibrating mass and on the resonance frequency thereof (here, the electrical angular frequency) with regard to the excitation unit.

The actual position of the deflection of the vibrating mass detected by means of detecting a deflection is converted into a vector for this purpose, the abscissa is the detected deflection and the ordinate is the velocity of the vibrating mass formed by means of velocity formation as a differentiation of the deflection according to the formula $$v(t) = \frac{dx}{dt}$$

v being the velocity, x the detected deflection and t the time.

The mechanical phase position generated by phase position generation is advantageously obtained, for example, by means of an arctan 2 function based on the deflection and the velocity according to the formula $$\theta m = \arctan 2(x, v)$$

$\Theta_m$ being the mechanical phase position, v the velocity and x the deflection.

In a preferred manner, a standardized velocity for generating the mechanical phase positions is selected as the velocity.

By means of phase position correction of the mechanical phase position, the corrected phase position is obtained continuously in an advantageous manner by means of a correction value.

For frequency formation of the electrical angular frequency, instead of the P-regulation (with the amplification component $K_p$), a PI-regulation (with the amplification component $K_p$ and the integral component I) or a PID-regulation (with the amplification component $K_p$, the integral component I and the differentiation component D) can also be used on the basis of the corrected phase position, which can qualitatively improve the P-regulation in the sense of greater regulation quality.

The electrical angular frequency which forms is also to be understood here as the current vibration frequency (requested resonance frequency) or the last current vibration frequency (last requested resonance frequency). Targeted learning of the regulation is therefore not necessary.

For forming a phase position of the electrical phase position, the electrical angular frequency is advantageously integrated.

Forming a factor of the correction factor takes place by means of the trigonometric function on the basis of the electrical phase position, for example by means of a sine function according to the formula $$kF = \sin(\theta el)$$

$k_F$ being the correction factor and $\Theta_{el}$ the electrical phase position.

By means of the setpoint value application, the excitation setpoint value is advantageously corrected as an electrical value for a vibration-generating force of the excitation unit for exciting the vibrating mass with the correction factor in such a way that a corrected electrical value for the vibration-generating force is generated as a corrected excitation setpoint value for the resonant vibration of the excitation unit and the vibrating mass to be achieved.

With this corrected excitation setpoint value, for example, an electromagnet is electrically excited by the excitation unit, which generates the corresponding resonant vibration of the excitation unit and the vibrating mass.

Advantageous embodiments of the resonance method are specified in the dependent claims.

In a first advantageous embodiment of the resonance method, the resonance method comprises the step of velocity standardization of the velocity to a standardized velocity by means of the electrical angular frequency, the velocity being divided by the electrical angular frequency.

In order to map the velocity in an advantageous manner to the electrical angular frequency, the velocity is converted on the basis of the electrical angular frequency into the standardized velocity according to the formula $$vn(t) = \frac{1}{\omega el} * \frac{dx}{dt}$$

$v_n$ being the standardized velocity, $\omega_{el}$ the electrical angular frequency, x the deflection and t the time.

In a further advantageous embodiment of the resonance method, the correction value for phase position correction is the fed-back electrical phase position and the fed-back electrical phase position is preferably subtracted from the mechanical phase position.

Thus, from the point of view of regulation, a balanced phase position is established, the mechanical phase position being corrected until the corrected phase position assumes a value of approximately 0.

The electrical phase position fed back as a correction value in a regulation loop to the mechanical phase position can also be added to the mechanical phase position taking into account the signs of the mechanical phase position and the electrical phase position.

In a further advantageous embodiment of the resonance method, an initial angular frequency is specified for method initialization or the last known electrical angular frequency used.

In order to initialize the resonance method, for example when it is started, the initial angular frequency can preferably be specified during the method initialization as, for example, a parameter which can also already correspond to the desired resonance frequency.

It is also advantageously possible, for example, to resort to the last known electrical angular frequency in the event of faults or a resetting of the regulation after a failure of the resonance method.

In a further advantageous embodiment of the resonance method, the mechanical phase position is determined in particular between a deflection amplitude of the deflection and the velocity or between a deflection amplitude of the deflection and the deflection.

The deflection amplitude can be determined according to the formula $$xa = \sqrt{x^2 + v^2}$$

$x_a$ being the deflection amplitude, x the deflection and v the velocity.

In a preferred manner, the standardized velocity is selected as the velocity for determining the deflection amplitude.

In a further advantageous embodiment of the resonance method, in order to detect a deflection, a deflection signal is detected by a deflection measuring apparatus and the deflection signal is corrected by a DC component as a function of the installation location of the deflection measuring apparatus with regard to the vibrating mass, the DC component being specified by a DC component parameter or determined by a DC component high-pass filter.

The deflection measuring apparatus measures the deflection of the vibrating mass with regard to a resting position of the vibrating mass and provides the resonance method with the deflection in the deflection signal for further processing.

A correction of the deflection measured value of the deflection with regard to the installation location of the deflection measuring apparatus, which deflection measured value is affected by the deflection signal, can be carried out by means of the DC component parameter or the DC component high-pass filter.

In a further advantageous embodiment of the resonance method, the excitation setpoint value is a setpoint current and the corrected excitation setpoint value is a corrected setpoint current.

The excitation setpoint value as an electrical value for the vibration-generating force and the corrected excitation setpoint value as a corrected electrical value for the vibration-generating force for controlling the electromagnets, for example, by means of an electrical converter, is in each case advantageously designed as a setpoint current for generating a force-forming vibration excitation. In principle, a corresponding setpoint voltage is also suitable for this purpose in each case.

In a further advantageous embodiment of the resonance method, the electrical angular frequency is monitored for faults in the resonant vibration of the excitation unit and the vibrating mass for the purpose of fault monitoring.

For this purpose, the electrical angular frequency can be monitored in an advantageous manner by a lower frequency limit for undershooting of the electrical angular frequency and/or an upper frequency limit for undershooting of the electrical angular frequency.

In order to achieve the object, a converter is furthermore proposed which comprises a detection means, configured for the deflection detection of a deflection of the vibrating mass, a first forming means, configured for the velocity formation of a velocity of the vibrating mass by means of differentiating the deflection, a generating means, configured for the generation of the phase position of a mechanical phase position by means of the deflection and the velocity, a correction means, configured for the correction of the phase position of the mechanical phase position by means of a correction value for a corrected phase position, a second forming means, configured for the frequency formation of an electrical angular frequency by means of at least one P-regulation on the basis of the corrected phase position, a third forming means, configured for the phase position formation of an electrical phase position by means of integration on the basis of the electrical angular frequency, a fourth forming means, configured for the factor formation of a correction factor by means of a trigonometric function on the basis of the electrical phase position and an application means, configured for the setpoint value application of the correction factor to an excitation setpoint value in order to generate a corrected excitation setpoint value.

In a first advantageous embodiment of the converter, the converter has a standardization means, configured for velocity standardization of the velocity to a standardized velocity by means of the electrical angular frequency, it being possible to divide the velocity by the electrical angular frequency.

In a further advantageous embodiment of the converter, the fed-back electrical phase position is provided as a correction value for correcting the phase position, and the fed-back electrical phase position can preferably be subtracted from the mechanical phase position.

In principle, the converter is designed to carry out the resonance method according to the invention shown above.

In order to achieve the object, an excitation unit is likewise proposed which comprises at least one electromagnet for exciting the vibrating mass, the converter according to the invention for operating the at least one electromagnet, and a deflection measuring apparatus for measuring the deflection of the vibrating mass with regard to a resting position of the vibrating mass.

The deflection measured by means of the deflection measuring apparatus is transmitted by a deflection signal to the detection means of the converter for deflection detection.

In an advantageous embodiment of the excitation unit, the excitation unit has at least one spring element, the at least one spring element being connected to the vibrating mass.

Solutions with two or more spring elements, by means of which the vibrating mass is mounted so as to be able to vibrate, are also conceivable here.

BRIEF DESCRIPTION OF THE DRAWING

In order to achieve the object, a vibration system is also proposed which comprises the excitation unit according to the invention and the vibrating mass.

In an advantageous embodiment of the vibration system, the vibration system is designed as a friction welding apparatus or as a transport apparatus.

Transport apparatuses are, for example, conveyor apparatuses for transporting material (so-called vibrators or vibratory conveyors), which convey their transported goods by means of vibrating conveyor belts.

Figure 1:
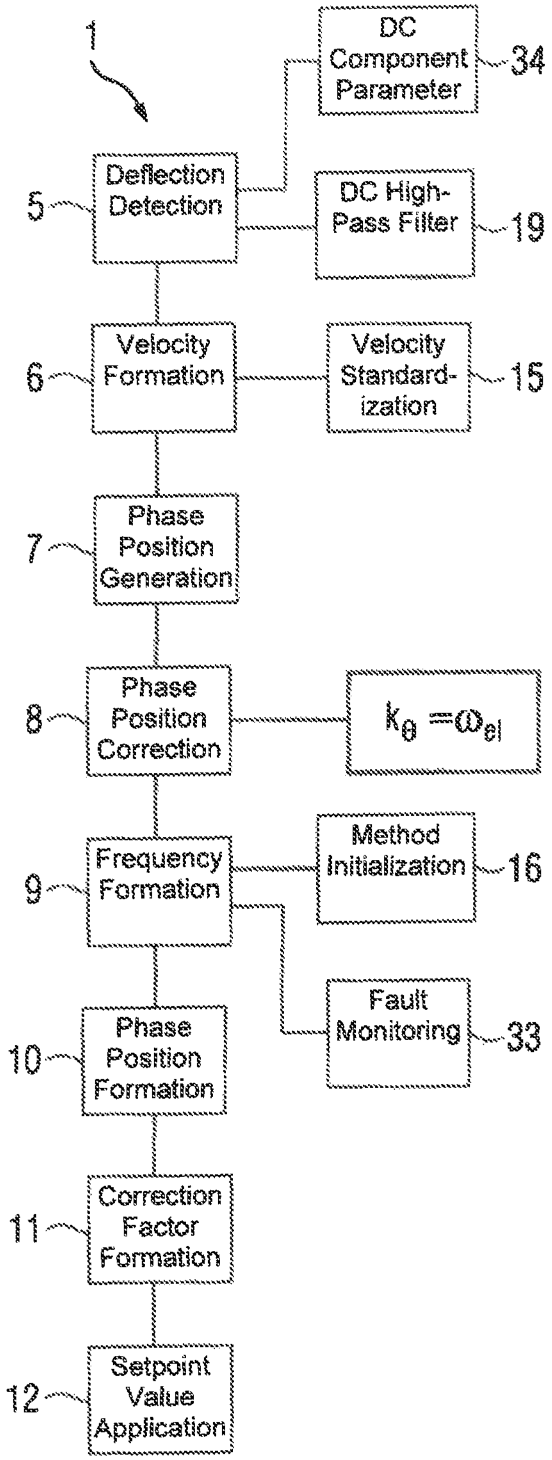
Figure 2:
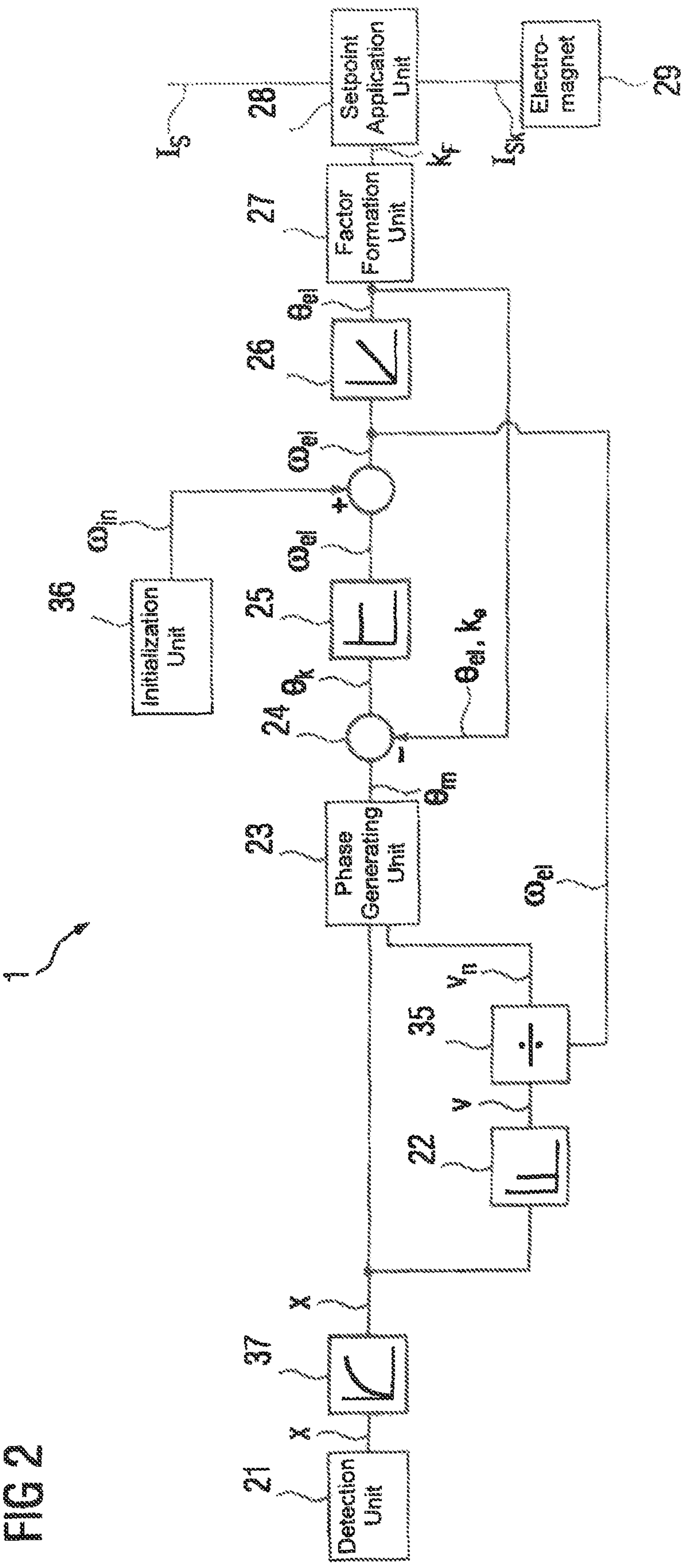
Figure 3:
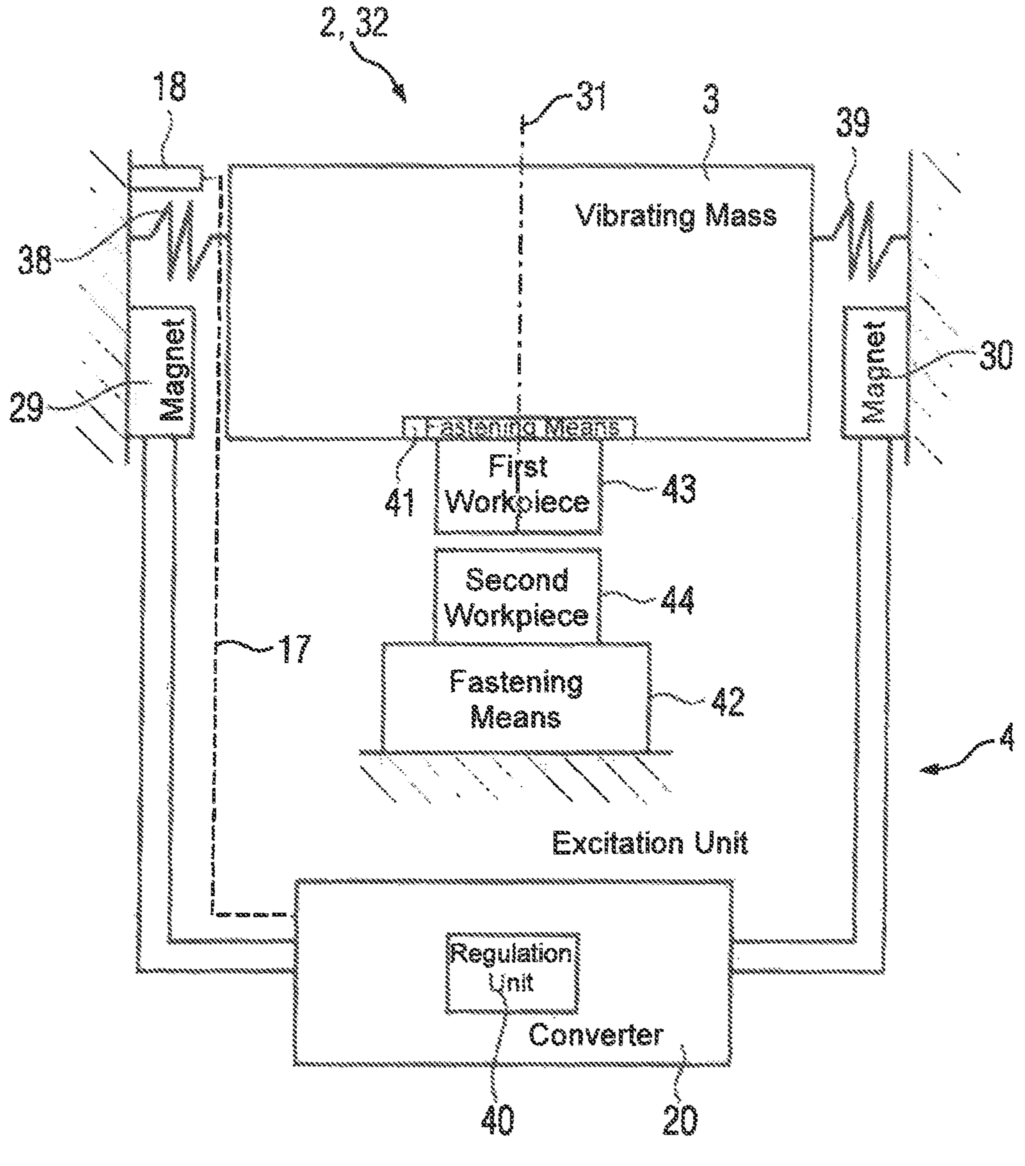

The properties, features and advantages of this invention described above and the manner in which they are achieved will become clearer and more readily comprehensible in connection with the following description of the exemplary embodiments, which are explained in more detail in connection with the figures. It is shown in:

FIG. 1 a structure chart of the resonance method according to the invention, FIG. 2 a diagrammatic regulation representation of the resonance method according to the invention and FIG. 3 a diagrammatic view of a friction welding apparatus with the converter according to the invention, the excitation unit according to the invention and the vibration system according to the invention.

DETAILED DESCRIPTION OF PREFERRED EMBODIMENTS

FIG. 1 shows a structure chart of the resonance method 1 according to the invention with method steps for resonant vibration of an excitation unit with a vibrating mass.

During deflection detection 5, a deflection of the vibrating mass is detected. A deflection signal detected for this purpose by a deflection measuring apparatus can be corrected by a DC component as a function of the installation location of the deflection measuring apparatus with regard to the vibrating mass, wherein the DC component can be specified by a DC component parameter 34 or determined by a DC component high-pass filter 19.

By differentiating the deflection, a velocity of the vibrating mass is formed during velocity formation 6, the velocity being converted into a standardized velocity on the basis of the electrical angular frequency by dividing the velocity by the electrical angular frequency.

In phase position generation 7, a mechanical phase position is generated on the basis of the deflection and the velocity.

Via phase position correction 8, the mechanical phase position is converted into a corrected phase position by a correction value. In this case, the correction value is the electrical phase position fed back in a control loop, wherein preferably the fed-back electrical phase position is subtracted from the mechanical phase position.

Frequency formation 9 of an electrical angular frequency takes place by means of at least one P-regulation on the basis of the corrected phase position. For frequency formation 9, the P-regulation can also be designed as a PI-regulation or as a PID-regulation.

For a method initialization 16, an initial angular frequency can be specified or the last known electrical angular frequency can be used.

Furthermore, the electrical angular frequency can be monitored for faults in the resonant vibration of the excitation unit and the vibrating mass. Typical faults can have their origins, for example, in mechanical defects during the vibration of the vibrating mass, so that the required electrical angular frequency can become too low or too high and the resonance method may have to be interrupted.

In phase position formation 10 of an electrical phase position, integration takes place on the basis of the electrical angular frequency.

During factor formation 11 of a correction factor, a trigonometric function on the basis of the electrical phase position is used and the correction factor corrects an excitation setpoint value to a corrected excitation setpoint value during setpoint value application 12.

FIG. 2 shows a diagrammatic regulation representation of the resonance method 1 according to the invention. In this case, the resonance method 1 can be carried out by a converter, in particular by a regulation unit of the converter.

A detection means 21 is designed for deflection detection 5 of a deflection x of the vibrating mass. A deflection signal detected as deflection x by a deflection measuring apparatus is, as a function of the installation location of the deflection measuring apparatus with regard to the vibrating mass, corrected by means of a high-pass means 37 of a DC component high-pass filter 19 by a DC component.

A first forming means 22 differentiates the deflection x by means of the velocity formation 6 into a velocity v of the vibrating mass. The velocity v is furthermore converted into a velocity standardization 15 by a standardization means 35 in a standardized velocity $v_n$ on the basis of a fed-back electrical angular frequency $\omega_{el}$ by dividing the velocity v by the electrical angular frequency $\omega_{el}$.

A generating means 23 is designed for phase position generation 7 of a mechanical phase position $\Theta_m$ which takes place on the basis of the deflection x and the velocity v.

A correction means 24 is designed for phase position correction 8 of the mechanical phase position $\Theta_m$, the mechanical phase position $\Theta_m$ being converted into a corrected phase position $\Theta_k$ by means of a correction value $k_\Theta$. A fed-back electrical phase position $\Theta_{el}$ is used as the correction value $k_\Theta$, the fed-back electrical phase position $\Theta_{el}$ being subtracted from the mechanical phase position $\Theta_m$.

A second forming means 25 for frequency formation 9 of the electrical angular frequency $\omega_{el}$ is designed on the basis of the corrected phase position $\Theta_k$ by means of here a P-regulation, which may also be a PI-regulation or a PID regulation. The electrical angular frequency $\omega_{el}$ is returned at this point to the standardization means 35 for velocity standardization 15.

An initial angular frequency $\omega_{in}$ can be specified by an initialization means 36 for method initialization 16.

By means of a third forming means 26, a phase position formation 10 of the electrical phase position $\Theta_{el}$ takes place by means of integration on the basis of the electrical angular frequency $\omega_{el}$. At this point, the electrical phase position $\Theta_{el}$ is returned to the correction means 24 for phase position correction 8.

From a fourth forming means 27, a factor formation 11 of a correction factor $k_F$ is carried out by means of a trigonometric function based on the electrical phase position $\Theta_{el}$.

An application means 28, designed for the setpoint value application 12 of an excitation setpoint value 13 in the form of a setpoint current $I_S$ with the correction factor $k_F$, generates a corrected excitation setpoint value 14 in the form of a corrected setpoint current $I_{Sk}$. In particular, this corrected setpoint current $I_{Sk}$ is used to operate an electromagnet which is comprised by the excitation unit and excites resonant vibration of the vibrating mass.

FIG. 3 shows a diagrammatic view of a friction welding apparatus 32 with the converter 20 according to the invention, the excitation unit 4 according to the invention and the vibration system 2 according to the invention.

Here, the vibration system 2 is designed by way of example, as a friction welding apparatus 32 with the excitation unit 4 and a vibrating mass 3.

A first fastening means 41 for a first workpiece 43 is arranged on the vibrating mass 3. The vibrating mass 3 with the first fastening means 41 and the first workpiece 43 is mounted so as to be able to vibrate.

Directly opposite the first workpiece 43, a second workpiece 44 is connected to a second fastening means 42. In this case, the second workpiece 44 on the second fastening means 42 is fixed in a fixed manner with regard to the first workpiece 43 and is not mounted so as to be able to vibrate.

The excitation unit 4 for the vibration excitation of the vibrating mass 3 comprises the converter 20, an electromagnet 29, a further electromagnet 30, a first and second spring element 38, 39 for mounting of the vibrating mass 3 so as to be able to vibrate, a deflection measuring apparatus 18 and a deflection signal transmitted from the deflection measuring apparatus 18 to the converter 20, which deflection signal has a measured actual value of deflection.

The deflection is measured by means of the deflection measuring apparatus 18 with regard to a resting position 31 of the vibrating mass 3.

The control method according to the invention can be carried out by means of the converter 20, in particular by means of the regulation unit 40 of the converter 20.

During operation of the friction welding apparatus 32, the first workpiece 43 fastened to the first fastening means 41 of the vibrating mass 3 is set into resonant vibrations with the excitation unit 4. The first workpiece 43, which is set into vibrations, rubs against the fixed second workpiece 44 which is not able to vibrate, frictional heat being generated and both workpieces 43, 44 being welded to one another in an energy-efficient manner and in a high production quality.

The invention claimed is:

1. A resonance method for a vibration system for resonant vibration of an excitation unit having a vibrating mass the method, comprising:

detecting a deflection of the vibrating mass;

differentiating the deflection to form a velocity of the vibrating mass;

generating from the deflection and the velocity a mechanical phase position;

forming from the mechanical phase position a corrected phase position by using a correction value, forming, based on the corrected phase position an electrical angular frequency with a P-regulation, forming from the electrical angular frequency a standardized velocity by dividing the velocity by the electrical angular frequency;

integrating the electrical angular frequency to determine an electrical phase position;

forming from the electrical phase position a correction factor by using a trigonometric function; and applying the correction factor to an excitation setpoint value to generate a corrected excitation setpoint value.

2. The resonance method of claim 1, wherein the correction value for phase position correction is a fed-back electrical phase position.

3. The resonance method of claim 2, wherein the fed-back electrical phase position is subtracted from the mechanical phase position.

4. The resonance method of claim 1, further comprising initializing the method by specifying an initial angular frequency or by using a last known electrical angular frequency.

5. The resonance method of claim 1, wherein the mechanical phase position is determined between a deflection amplitude of the deflection and the velocity.

6. The resonance method of claim 1, further comprising:

detecting the deflection with a deflection signal from a deflection measuring apparatus; and correcting the deflection signal with a DC component depending on the Installation location of the deflection measuring apparatus relative to the vibrating mass, wherein the DC component is predetermined by a DC component parameter or the DC component is determined by a DC component high-pass filter.

7. The resonance method of claim 1, wherein the excitation setpoint value is a setpoint current and the corrected excitation setpoint value is a corrected setpoint current.

8. The resonance method of claim 1, further comprising detecting faults by monitoring the electrical angular frequency for disturbances in the resonant vibration of the excitation unit and the vibrating mass.

9. A converter comprising:

a detection unit configured to detect a deflection of a vibrating mass;

a first forming unit configured to form a velocity of the vibrating mass by differentiating the deflection;

a generating unit configured to generate from the deflection and the velocity a mechanical phase position;

a correction unit configured to form from the mechanical phase position a corrected phase position by using a correction value;

a second forming unit configured to form, based on the corrected phase position, an electrical angular frequency with a P-regulation;

a standardization unit configured to form from the electrical angular frequency a standardized velocity by dividing the velocity by the electrical angular frequency;

a third forming unit configured to integrate the electrical angular frequency to determine an electrical phase position;

a fourth forming unit configured to form from the electrical phase position a correction factor by using a trigonometric function; and an application unit configured to apply the correction factor to an excitation setpoint value to generate a corrected excitation setpoint value.

10. The converter of claim 9, wherein the correction value for phase position correction is a fed-back electrical phase position.

11. The converter of claim 10, wherein the fed-back electrical phase position is subtracted from the mechanical phase position.

12. An excitation unit, comprising:

an electromagnet exciting a vibrating mass;

a converter as set forth in claim 9 for operating the electromagnet; and a deflection measuring apparatus measuring the deflection of the vibrating mass with respect to a resting position of the vibrating mass.

13. The excitation unit of claim 12, further comprising a spring element connected to the vibrating mass.

14. The excitation unit of claim 12, wherein the correction value for phase position correction is a fed-back electrical phase position.

15. The excitation unit of claim 14, wherein the fed-back electrical phase position is subtracted from the mechanical phase position.

16. A vibration system, comprising:

a vibration mass; and an excitation unit comprising an electromagnet exciting the vibrating mass, a converter as set forth in claim 9 for operating the electromagnet, and a deflection measuring apparatus measuring the deflection of the vibrating mass with respect to a resting position of the vibrating mass.

17. The vibration system of claim 16, embodied as a friction welding apparatus or as a transport apparatus.

* * * * *